(12) United States Patent
Singerl et al.

(10) Patent No.: US 8,565,338 B2
(45) Date of Patent: *Oct. 22, 2013

(54) HIGH BANDWIDTH MODULATION AND TRANSMISSION

(75) Inventors: Peter Singerl, Villach (AT); Thomas Blocher, Graz (AT); Thomas Poetscher, Villach (AT); Andreas Wiesbauer, Poertschach (AT)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/570,220

(22) Filed: Aug. 8, 2012

(65) Prior Publication Data
US 2012/0300879 A1    Nov. 29, 2012

Related U.S. Application Data

(63) Continuation of application No. 12/241,082, filed on Sep. 30, 2008, now Pat. No. 8,254,493.

(51) Int. Cl.
*H04L 27/00* (2006.01)
(52) U.S. Cl.
USPC ........... 375/295; 375/135; 375/226; 375/320; 375/322; 375/334; 375/297; 375/350; 375/302; 375/298; 375/286; 375/365

(58) Field of Classification Search
USPC ......... 375/295, 300, 302, 296, 297, 298, 226, 375/322, 365; 455/102, 108, 126, 110, 313, 455/118; 330/10, 52, 149, 136, 151, 313
See application file for complete search history.

(56) References Cited

U.S. PATENT DOCUMENTS
6,538,509 B2    3/2003  Ren

OTHER PUBLICATIONS

Colantoni et al., "A RF Approach for the Implementation of the LINC Technique", Proceedings of the 36th European Microwave Conference, Rome, IT, Sep. 2006, pp. 1143-1146.
B. Rembold et al., "CLIER—Combination of LINC and EER Method", Electronic Letters, vol. 42, No. 16, Aug. 3, 2006.
Prosecution from U.S. Appl. No. 12/241,082, filed Sep. 30, 2008, to include the following documents and at least the references indicated thereon: Jun. 2, 2011 List of references cited by examiner; Jun. 2, 2011 Non-Final Rejection; Nov. 17, 2011 List of references cited by examiner; Nov. 17, 2011 Final Rejection; Feb. 24, 2012 Advisory Action; Apr. 27, 2012 Notice of Allowance and Fees Due; Jun. 14, 2012 Notice of Allowance and Fees Due.

*Primary Examiner* — Dhaval Patel
(74) *Attorney, Agent, or Firm* — SpryIP, LLC

(57) ABSTRACT

This disclosure relates systems and methods for a high bandwidth modulation and transmission of communication signals.

24 Claims, 8 Drawing Sheets

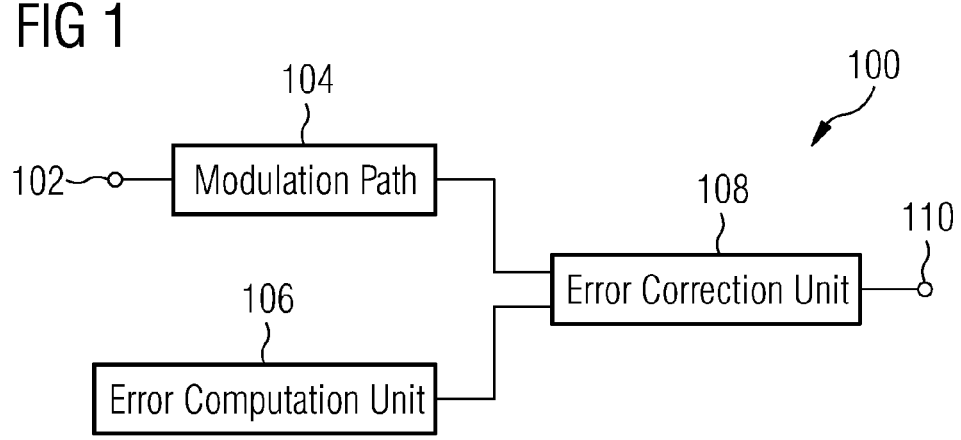
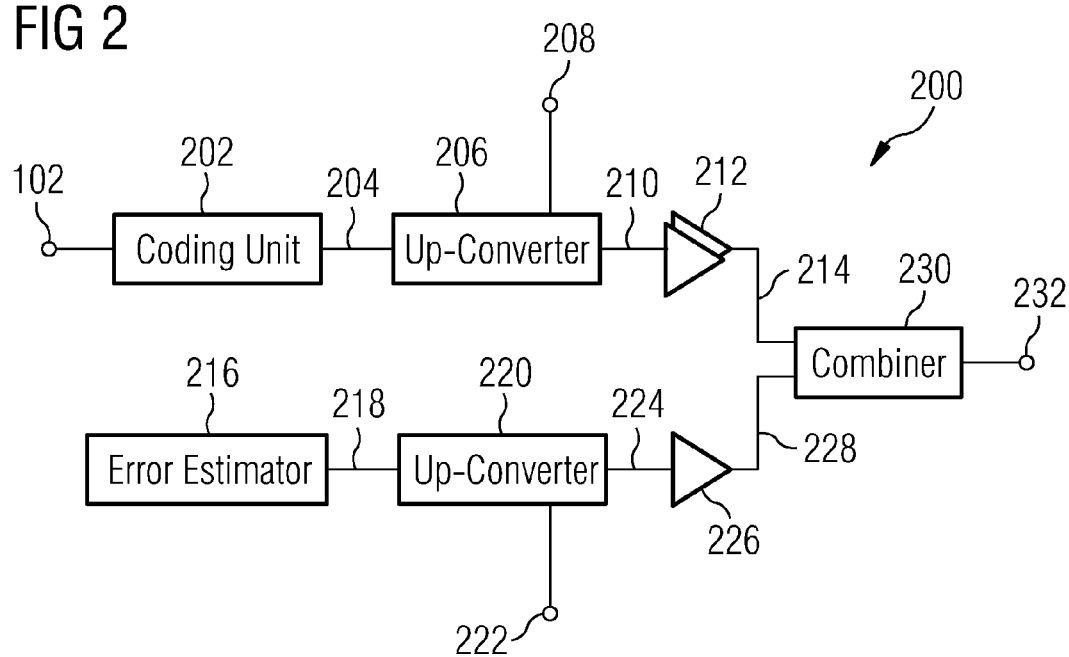

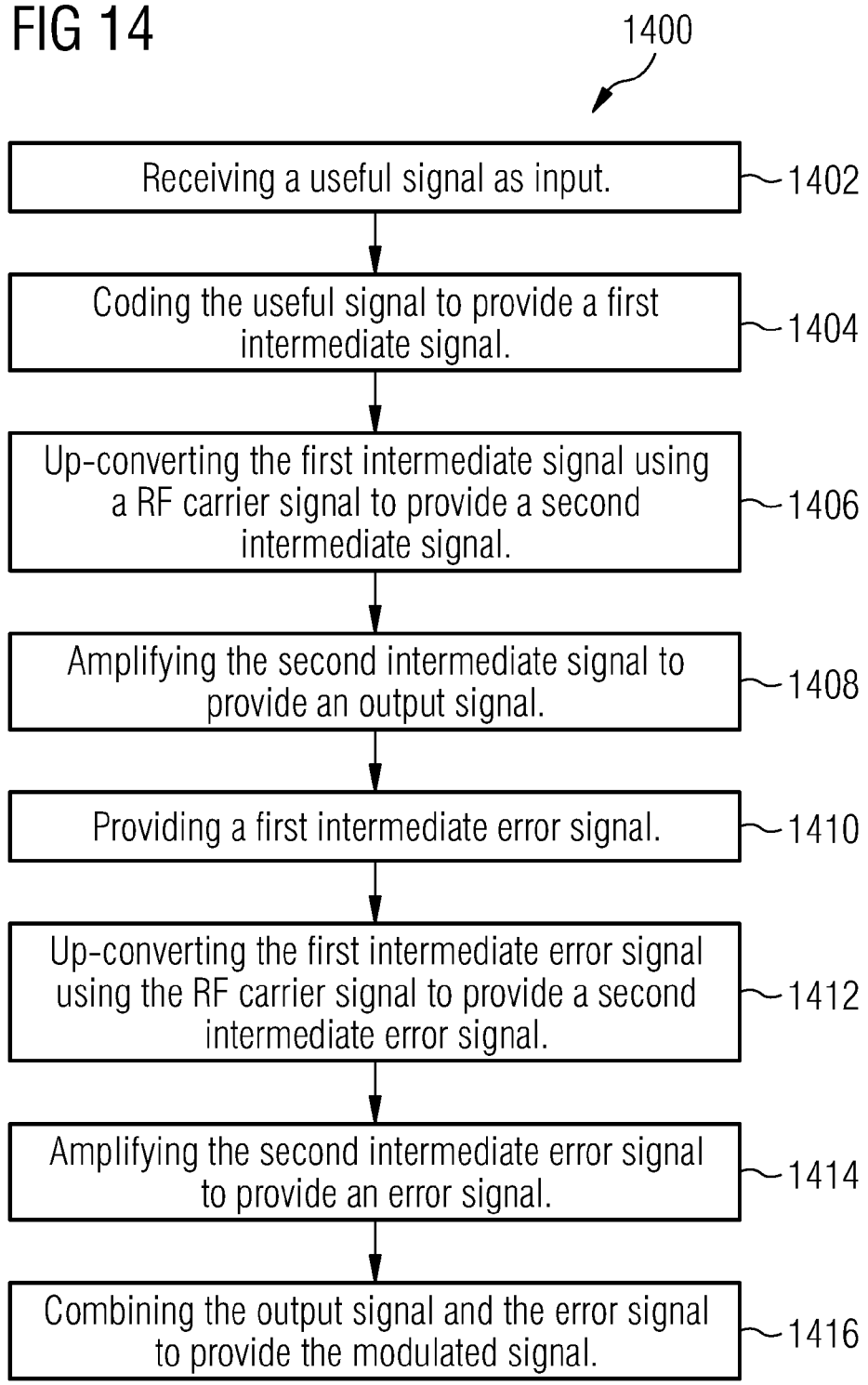

HIGH BANDWIDTH MODULATION AND TRANSMISSION

RELATED APPLICATIONS

This application is a Continuation Application of application Ser. No. 12/241,082, which was filed on Sep. 30, 2008. The entire contents of the Application are incorporated herein by reference.

BACKGROUND

A modulator is arranged in a device for signal transmission, such as used in systems for wireless or wireline communication. One of the functions of a modulator is to modulate a useful signal representing an information to be transmitted onto a carrier frequency signal so to provide a transmission signal. The transmission signal is amplified before being provided to a transmission channel. In case of a base-station of a mobile communication system, the amplifier has to provide for a high amplification gain.

Generally, in mobile communication systems, diverse modulation schemes allowing for a high bandwidth are provided, such as EDGE (Enhanced Data Rates for GSM Evolution), UMTS (Universal Mobile Telecommunication System), etc. These modulation schemes usually provide a non-constant envelope of the transmission signal. This may be due to an amplitude modulation of the transmission signal. The amplitude modulation carries part of the information transmitted. To allow for a correct demodulation and reassembly of the information, certain linearity requirements have to be fulfilled by the modulator. E.g., the linearity requirements are set by a standard specification. In consequence, the power amplifier of a base-station has to provide a linear amplification over a wide range of signal level. This is usually achieved by providing for a "quasi-linear" amplifier running with a high back-off to ascertain the linearity requirements with respect to the transmission signal. This mode of operation leads to a low efficiency in power and usually to higher costs in production of an according modulator.

For these and other reasons, there is a need for the present invention.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 1 is a block diagram illustrating an exemplary transmission device.

FIG. 2 is a block diagram illustrating an exemplary transmission device.

FIG. 14 illustrates an exemplary method for modulating a useful signal into a modulated signal.

DETAILED DESCRIPTION

Figure 3:
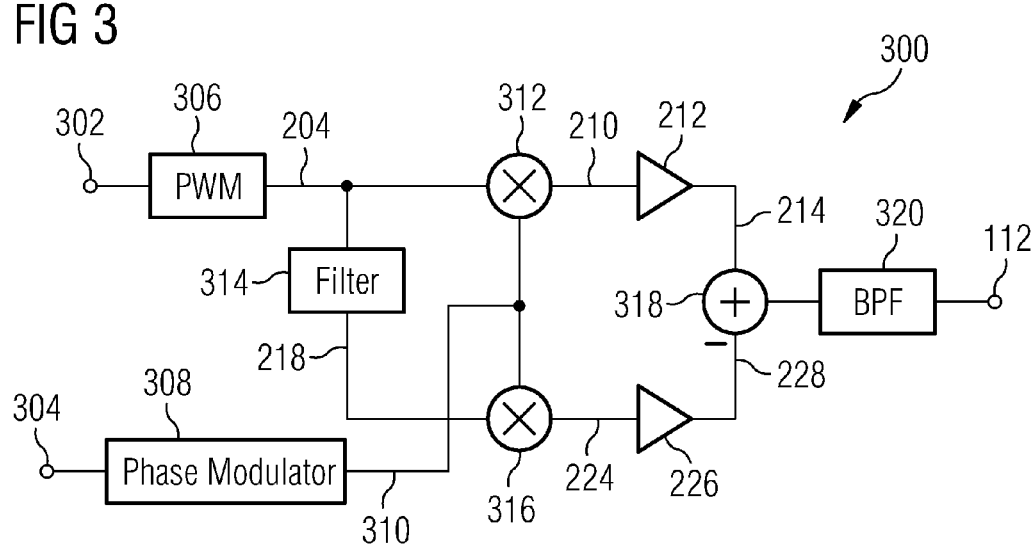
FIG. 3 is a block diagram illustrating an exemplary modulator.

This disclosure is directed to techniques for modulation in a transmission device. More particularly, the techniques involve implementation of a transmission device and of a modulator. The disclosed apparatus' can be implemented in a variety of communication devices or systems. For example, a transmission device or a modulator can be implemented in mobile phones, base stations, etc. The following systems and methods are described with reference to a mobile communication system; however, it will be appreciated that the disclosed transmission devices and modulators can be implemented generally in any electronic communication system.

Mobile communication systems include components such as mobile communication devices, base stations, etc., that can receive input signals . . . .

The disclosed technique for implementing a modulation involves a combination of a switched output stage and an error estimation path.

Exemplary Systems

FIG. 1 illustrates an exemplary transmission device 100. The order in which the blocks of the system are described, is not intended to be construed as a limitation, and any number of the described system blocks can be combined in any order to implement the system, or an alternate system. Additionally, individual blocks may be deleted from the system without departing from the spirit and scope of the subject matter described herein. Furthermore, the system can be implemented in any suitable hardware, software, firmware, or a combination thereof, without departing from the scope of the invention.

The transmission device includes an input 102. A baseband signal comprised of information to be transmitted may be received at the input 102. The baseband signal is passed to a Modulation Path 104. The Modulation Path 104 performs a modulation of the baseband signal to produce an output signal. A modulation may include any of the following signal processing: coding; up-converting the baseband signal on a carrier signal; amplifying; filtering; etc. The different kind of signal processing may be performed at various sequence or times.

The Modulation Path 104 includes one or several switched output stages not shown in FIG. 1. A switched output stage may be a switched amplifier, i.e. an amplifier of any of Class-F; Inverse Class F; Class D, Class S, etc. In an ideal switched amplifier, current and voltage are not present at the same time. In consequence, high power efficiency is achieved.

To achieve an according bandwidth, the Modulation Path 100 may include a plurality of switched output stages in parallel. In another embodiment, it may include a single switched output stage. In one embodiment, it includes at least one serial circuit of switched output stages to achieve a required power level of the output signal.

In one embodiment, the Modulation Path 104 further includes a coding unit that performs a coding the time depending phase component and the time depending envelope component of the input signal received at input 102. The coding unit may thus be arranged to provide a high bandwidth modulation scheme, such as 8-PSK, used in EDGE, UMTS, etc. One elementary function of the coding unit is to provide a rectangular pulse train derived from the baseband signal provided at the input 102. Exemplary implementations of the coding unit make use of a Delta-Sigma Modulation, Pulse-Width Modulation or any other method to transform an envelope signal into pulses. One aspect of using a coding unit is that the spectrum of the rectangular pulse train concentrates at multiples of the reference frequency used in the coding unit. Thereby, gaps in the spectrum may be used to improve the SNR in the high frequency domain, e.g. after up-converting the rectangular pulse train on a carrier frequency. Another aspect is that the frequency of switching at the output stage is reduced in comparison to a known band-pass modulator. Thus, a high efficiency is achieved while spectral components concentrate around the carrier frequency, which implies a smaller bandwidth of the output stage needed.

The transmission device 100 further includes an Error Computation Unit 106. The function of the Error Computation Unit 106 is to estimate an according Inband Error of the output signal produced by the Modulation Path 104. This is achieved by producing an error signal based on information on error contributions, such as unwanted image components, quantization effects, non-linearity present in the output signal provided by the Modulation Path 104. Information on error contributions may be retrieved by a feedback or feed forward kind of correction, i.e. by using at least one of:
- a copy of the output signal, such as a down-converted version of the signal provided by the switched output stage;
- a copy of the rectangular pulse train produced by the coding unit;
- a copy of the baseband signal; etc.

Estimation of the Inband Error may be performed in either the digital or the analogue baseband section of the transmission device 100.

The Error computation unit 106 includes a linear output stage not shown in FIG. 1. A linear output stage may be a linear amplifier, i.e. an amplifier of any of Class-A; Class B, Class AB, etc. In consequence, a simple output stage implementation may be used. Since the power level Inband Error of Modulation Path 104 will generally be much smaller than the power level of the Inband part of the output signal produced by Modulation Path 104, a linear amplifier is sufficiently reliable to transfer the signal representing the Inband Error on a necessary power level.

The transmission device 100 further includes an Error Correction Unit 108. The Error Correction Unit 108 receives the output signal provided by the Modulation Path 104 and the error signal provided by the Error Computation Unit 106. Its function is to correct the output signal by the error signal to produce a transmission signal. The Error Correction Unit 108 may include any of the following apparatus': an adder; a power combiner; a filter, such as a band-pass filter, etc. The transmission signal is provided at an output 110 comprised by the transmission device 100. The output 110 may couple to a feed to feeds the transmission signal into a transmission channel, such as an antenna or a plug.

FIG. 2 illustrates an exemplary system including a modulator for modulating a useful signal into a modulated signal. The system 200 may be arranged in an RF (radio frequency) transmission section of a base-station. The system 200 receives an input signal or incoming data-stream 102. The input signal 102 may correspond to baseband signal, as described with respect to FIG. 1. The input signal 102 is passed to a Coding Unit 202.

The Coding Unit 202 performs a coding the time depending phase component and the time depending envelope component of the input signal 102. The Coding Unit 202 may thus be arranged to provide a high bandwidth modulation scheme, such as 8-PSK, used in EDGE, UMTS, etc. One elementary function of the Coding Unit 202 is to provide a pulse train derived from the input signal 102. Exemplary implementations of the Coding Unit 202 make use of a Delta-Sigma Modulation or of a Pulse-Width Modulation or any other method to transform an envelope signal into pulses. In general, the Coding Unit 202 produces a first intermediate signal 204, being a rectangular pulse train.

An Up-Converter 206 receives the first intermediate signal 204. It further receives a carrier signal 208, i.e. a high frequency signal. The Up-Converter 206 performs an up-conversion of the first intermediate signal 204 by the carrier signal 208 to produce a second intermediate signal 210. This corresponds to shifting the center frequency of the first intermediate signal 204, i.e. baseband, to the center frequency of the carrier signal 208, i.e. the carrier frequency.

In many communication systems, the carrier frequency is more than 1 GHz. Yet, in other communication systems, the carrier frequency may be lower than 1 GHz, e.g. in GSM it is 800-900 MHz.

The Up-Converter 206 may include a mixing device, such as a multiplier. A local oscillator, not shown in FIG. 2, may provide the carrier signal 208. It may be phase modulated by a phase modulator, to include part of the information to be transmitted.

A Switched Output Stage 212 receives the second intermediate signal 210. It performs an amplification of the second intermediate signal 210 to provide an output signal 214. The Switched Output Stage 212 may include a switched amplifier, i.e. an amplifier of any of Class-F; Inverse Class F; Class D, Class S, etc. To achieve an according bandwidth/output-power, Switched Output Stage 212 may include a plurality of switched amplifiers in parallel. In another embodiment, it may include a single switched amplifier. In one embodiment, it includes at least one serial circuit of switched amplifiers to achieve a required power level of the output signal 214.

The system 200 further includes an Error Estimator 216. The Error Estimator 216 estimates an Inband Error of the output signal 214. This is achieved by producing an error signal based on information on error contributions, such as unwanted image components, quantization effects, non-linearity present in the output signal 214. Information on error contributions may be retrieved by a feedback or feed forward kind of correction, i.e. by using at least one of:
- a copy or derivative of the output signal 214, such as a down-converted version of the signal provided by the switched output stage 212;
- a copy or derivative of the first intermediate signal 204;
- a copy or derivative of the second intermediate signal 210;
- a copy or derivative of the input signal 102; etc.

Estimation of the Inband Error may be performed in either the digital or the analogue baseband section of the system 200. The Error Estimator 216 provides a first intermediate error signal 218 based on the estimated Inband Error.

A second Up-Converter 220 receives the first intermediate error signal 218. It further receives a second carrier signal 222, i.e. a high frequency signal. The second carrier signal 222 may be identical to the carrier signal 208. The second Up-Converter 220 may be of a structure similar to Up-Converter 206. It performs an up-conversion of the first intermediate error signal 218 by the carrier signal 222 to produce a second intermediate error signal 224. This corresponds to shifting the center frequency of the first intermediate error signal 218, e.g baseband, to the center frequency of the carrier signal 222, i.e. the carrier frequency.

A Linear Output Stage 226 receives the second intermediate error signal 224. It performs an amplification of the second intermediate error signal 224 to provide an error signal 228. It includes a linear amplifier, such as a Class A, Class B, Class AB, etc. The inventors have recognized that the dynamic range of the error signal 228 is much smaller than the dynamic range of the output signal 214. It is therefore sufficient to perform amplification of the error signal by a simple linear amplification structure.

The system 200 further includes a Combiner 230. The Combiner 230 receives the output signal 214 and the error signal 228. It performs a combination of the output signal 214 and the error signal to provide a transmission signal 232. This may be achieved by subtracting or adding the error signal 228 to the output signal 214. The Combiner 230 may also perform a band-pass filtering of the result of combination. The transmission signal 232 may be transferred to a transmission channel by means of an according feed, such as an antenna or a plug.

The Coding Unit 202, the Up-Converter 206, and the Switched Output stage 212 form a Modulation Path that provides the output signal 214, derived from input signal 102 by a modulation of the later. The modulation of the input signal 102 is performed by making use of a switched amplification. There is a large variety of coding an envelope section and/or a phase section of a baseband signal to achieve an according input to the switched amplifier. This includes techniques, such as an Envelope Modulation, which is described in further detail with respect to FIG. 3, or as a Cartesian Modulation, resp. an IQ-Modulation, which is described in further detail with respect to FIG. 4.

FIG. 3 illustrates an exemplary system including a modulator for modulating a useful signal into a modulated signal. The system 300 makes use of an Envelope Modulation. The system 300 receives an input signal or incoming data-stream. The input signal may correspond to baseband signal, as described with respect to FIG. 1. The input signal includes a first input signal 302 representing an envelope component of the input signal. It further includes a second input signal 304 representing a phase component of the input signal.

A Pulse Width Modulator (PWM) 306 receives the first input signal 302. It performs a coding of the first input signal 302 to a rectangular pulse stream. The PMW 306 operates at a reference frequency chosen with regard to the bandwidth of the envelope component and to the required SNR. It produces a first intermediate signal 204 in form of a pulse stream. The width of a pulse is in linear relation to a value of an amplitude at a sampling time determined by the reference frequency.

A Phase Modulator 308 receives the second input signal 304. The Phase Modulator 308 provides a high-frequency and phase modulated LO signal 310 having a center frequency at a carrier frequency of the system 300. It may include any structure of a frequency synthesizer, such as a Digitally Controlled Oscillator (DCO), a Voltage Controlled Oscillator (VCO); a Phase-Locked Loop (PLL), a Digital PLL (DPLL), a Ring Oscillator; etc. The LO signal 310 thus carries the phase information of the input signal, shifted to the carrier frequency. In many embodiments, the LO signal 310 is a rectangular (bit-like) pulse stream.

A First Mixer 312 receives the first intermediate signal 204 and the LO signal 310. It mixes or performs of a multiplication of the two to provide a second intermediate signal 210. In real implementation, a knot may replace the First Mixer 312. A Switched Output Stage 212, as described with respect to FIG. 2 receives the second intermediate signal 210 to provide an output signal 214.

A Filter 314 receives the first intermediate signal 204. It performs a filtering of the first intermediate signal 204 to estimate an Inband Error. The Filter 314 may include a high-pass type of filter. It provides a first intermediate error signal 218.

A Second Mixer 316 receives the first intermediate error signal 218 and the LO signal 310. It mixes or performs of a multiplication of the two to provide a second intermediate error signal 224. In real implementation, a knot may replace the Second Mixer 316. A Linear Output Stage 226, as described with respect to FIG. 2 receives the second intermediate error signal 226 to provide an error signal 228.

An Adder/Power-Combiner 318 receives the output signal 214 and the error signal 228. It subtracts the error signal 228 from the output signal 214. The resulting signal is passed to a Band-Pass Filter (BPF) 320. The BPF 320 performs a band-pass filtering to provide a transmission signal 112. The transmission signal 232 may be transferred to a transmission channel by means of an according feed, such as an antenna or a plug.

Figure 4:
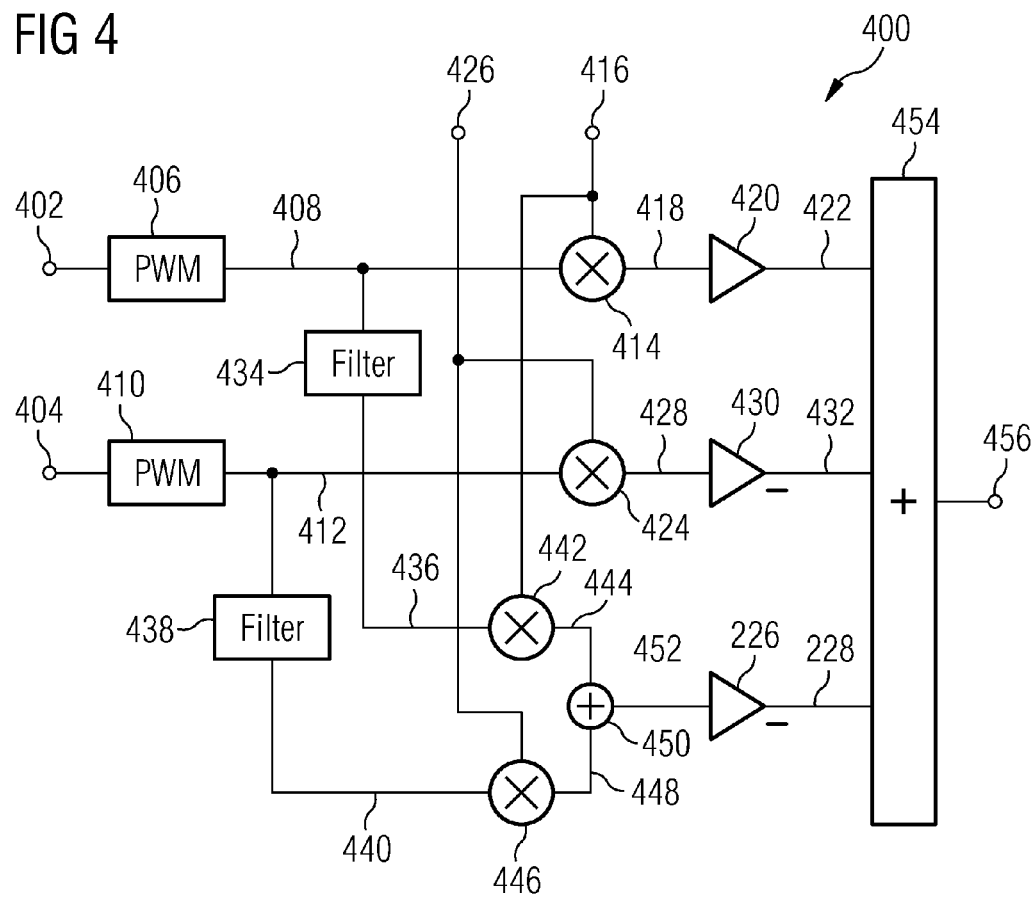
FIG. 4 is a block diagram illustrating an exemplary IQ-modulator.

FIG. 4 illustrates an exemplary system including a modulator for modulating a useful signal into a modulated signal. The system 400 makes use of an IQ Modulation. The system 400 receives an input signal or incoming data-stream. The input signal may correspond to baseband signal, as described with respect to FIG. 1. The input signal includes a first input signal 402 representing an Inphase component (I) of the input signal. It further includes a second input signal 404 representing a Quadrature component (Q) of the input signal.

A First PWM 406 receives the first input signal 402. It performs a coding of the first input signal 402 to a rectangular pulse stream. The First PMW 406 operates at a reference frequency chosen with regard to the signal bandwidth and to the required SNR. It produces a first intermediate signal 408 in form of a rectangular pulse stream. Since the Inphase component takes positive, as well as negative values, a 3 level pulse-width modulation may be applied. A pulse thus may take one of the values (+A, 0, −A), A being the maximal amplitude of the rectangular pulse stream. Transition from +A to −A may always pass through 0 to avoid phase shifts by 180° (i.e. by Pi). The width of a pulse is in linear relation to a value of amplitude of the first input signal 402 at a sampling time determined by the reference frequency.

A Second PWM 410 receives the second input signal 404. It performs a coding of the second input signal 404 to a rectangular pulse stream. The Second PMW 408 operates at same reference frequency as the First PWM 406. It produces a second intermediate signal 412 in form of a rectangular pulse stream. Since the Quadrature component takes positive, as well as negative values, a 3 level pulse-width modulation may be applied. A pulse thus may take one of the values (+A, 0, −A), A being the maximal amplitude of the rectangular pulse stream. Transition from +A to −A may always pass through 0 to avoid phase shifts by 180° (i.e. by Pi). The width of a pulse is in linear relation to a value of amplitude of the second input signal 404 at a sampling time determined by the reference frequency.

A First Mixer 414 receives the first intermediate signal 408 and a LO signal 416. It mixes or performs of a multiplication of the two to provide a third intermediate signal 418. In real implementation, a knot may replace the First Mixer 414. The LO signal 416 may be provided by a frequency synthesizer or Local Oscillator, such as, such as a Digitally Controlled Oscillator (DCO), a Voltage Controlled Oscillator (VCO); a Phase-Locked Loop (PLL), a Digital PLL (DPLL), a Ring Oscillator; etc. A First Switched output stage 420, as described with respect to FIG. 2 receives the third intermediate signal 418 to provide an Inphase output signal 422.

A Second Mixer 424 receives the first intermediate signal 412 and a phase-shifted LO signal 426. It mixes or performs of a multiplication of the two to provide a fourth intermediate signal 428. In real implementation, a knot may replace the Second Mixer 424. The phase-shifted LO signal 426 corresponds to the LO signal 416 by a phase-shift of 90° (i.e. Pi/2). The phase shifted LO signal 426 may be derived from the LO signal 416, e.g by a phase shifting device, a delay line, etc. A frequency synthesizer, the same or a different to the frequency synthesizer that generates LO signal 416 may generate the phase-shifted LO signal 426. A Second Switched Output Stage 430, as described with respect to FIG. 2 receives the fourth intermediate signal 428 to provide an Quadrature output signal 432.

The signal paths including the First Mixer 414, the First Switched Output Stage 420, the second Mixer 424 and the Second Switched Output Stage 430 form an IQ-Modulation Path.

A First Filter 434 receives the first intermediate signal 408. It performs a filtering of the first intermediate signal 408 to estimate an Inphase component of an Inband Error. The First Filter 434 may include a highpass type of filter. It provides a first intermediate error signal 436. A Second Filter 438 receives the second intermediate signal 412. It performs a filtering of the second intermediate signal 412 to estimate an Quadrature component of an Inband Error. The Second Filter 438 may include a highpass type of filter. It provides a second intermediate error signal 440.

A Third Mixer 442 receives the first intermediate error signal 436 and the LO signal 416. It mixes or performs of a multiplication of the two to provide a third intermediate error signal 444. A Fourth Mixer 446 receives the second intermediate error signal 440 and the phase-shifted LO signal 426. It mixes or performs of a multiplication of the two to provide a fourth intermediate error signal 448. An Adder 450 receives the third intermediate error signal 444 and the fourth intermediate error signal 448 to provide a combined error signal 452. A Linear Output Stage 226, as described with respect to FIG. 2 receives the combined error signal 452 to provide an error signal 228.

The system 400 further includes a combiner 454 that receives the Inphase output signal 422 and the Quadrature output signal 432 to perform a phase-correct combination of both. It further receives the error signal to subtract the Inband Error contribution. It thus provides a transmission signal 456 that may be passed via a BPF to a transmission channel, e.g. by means of a plug or an antenna.

In general, any high-frequency signal may be written in the subsequent representation, if being phase- and amplitude-modulated:

$$x(t)=a(t)\cos(\omega_c t+\phi(t)). \quad (1)$$

The amplitude a(t) of the signal depends on time t, like the phase $\phi(t)$ is time-depending. Time-dependency of both components is used to code information on the signal. The carrier frequency $f_c$ is considered by $\omega_c=2*Pi*f_c$. Because of the time-dependancy of the amplitude a(t), this signal may not be used for controlling a switched amplifier. In the described technique, the envelope contribution a(t) is coded, e.g. using a pulse-width modulation.

Figure 5:
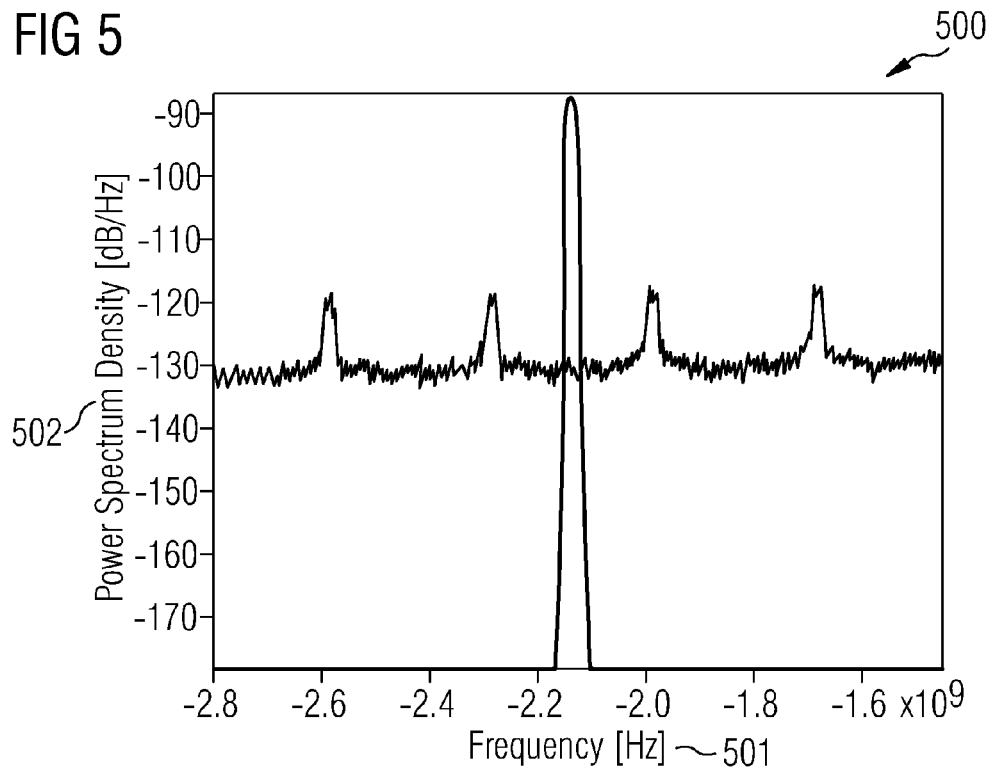
FIG. 5 is a signal diagram illustrating exemplary signals in relation to a Pulse-Width-Modulator (PWM).
Figure 6:
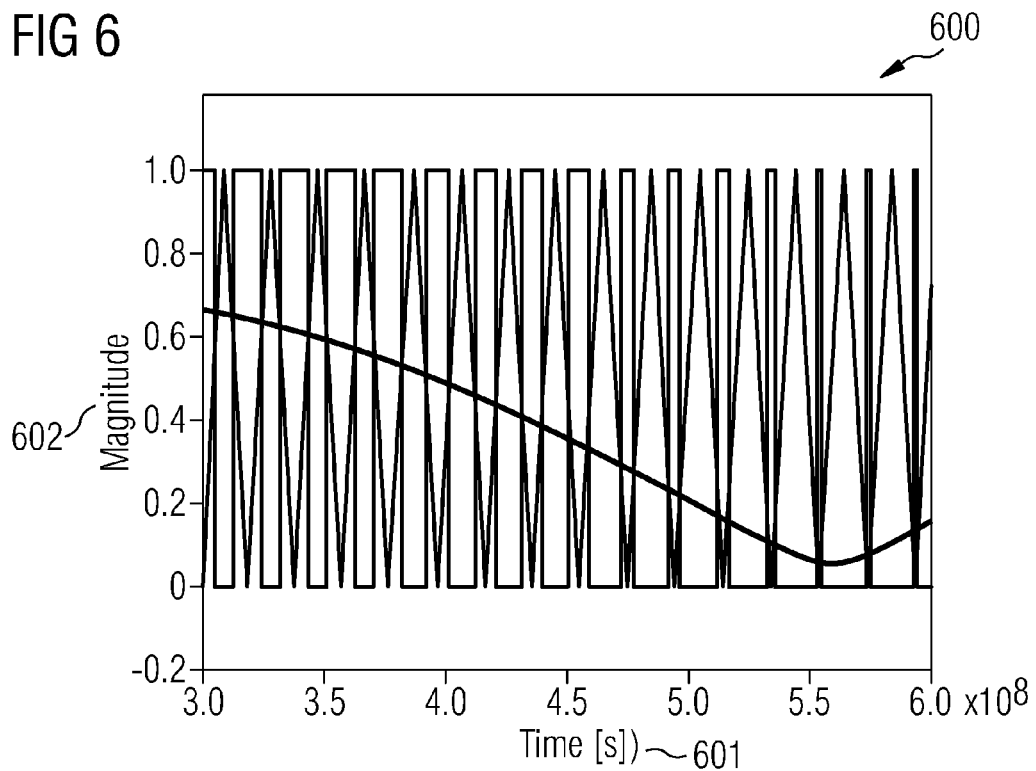
FIG. 6 is a signal diagram illustrating exemplary frequency spectrum of signals in relation to a PWM.
Figure 7:
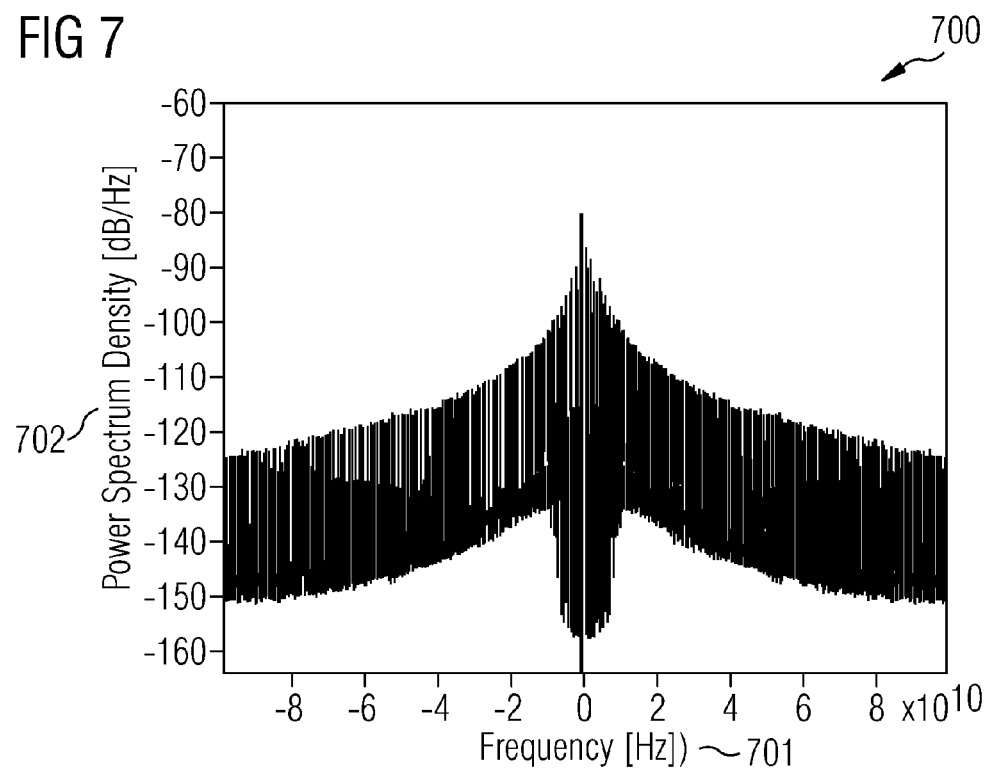
FIG. 7 is a signal diagram illustrating exemplary frequency spectrum of signals in relation to a PWM.

The resulting coded signal is a rectangular pulse signal having a constant frequency, which depends on the reference frequency of the applied coding, such as delta-sigma coding, pulse-width modulation, etc. In pulse-width modulation, the pulse length is in linear dependency of the amplitude a(t). The reference frequency is chosen in dependency of bandwidth of the envelope contribution, i.e. the amplitude. It will also be chosen with respect to a required SNR: In general, it is smaller than a frequency used in known techniques, such as a Bandpass Modulation. The time domain of an envelope signal modulated by a pulse-width modulation is shown in FIG. 5, FIG. 6, and FIG. 7. The signal diagrams show exemplary values of signals that vary for different systems. They are but an exemplary illustration of the effect of the described technique.

FIG. 5 is a signal diagram 500 illustrating exemplary signals in relation to a Pulse-Width-Modulator (PWM). On the abscissa 501, a short time interval of $3*10^{-8}$ s is shown. On the ordinate 502, a normalized magnitude of an envelope signal 503 and of a respective PWM signal 504 are depicted.

FIG. 6 and FIG. 7 are signal diagrams 600 and 700 illustrating the spectrum of exemplary signals in relation to a Pulse-Width-Modulator (PWM). The abscissa 601 shows a frequency domain $[-9*10^{10}$ Hz, $9*10^{10}$ Hz]. On the ordinate 602 a Power Spectrum Density in the domain [−160 dB/Hz, −60 dB/Hz] of a baseband signal 603, an envelope signal 604 and a PWM modulated envelope signal 605 are depicted. Signal diagram 700 shows a different frequency domain $[-1.5*10^9$ Hz, $1.5*10^9$ Hz] on abscissa 701 for the same system as used with respect to diagram 600. Ordinate 702 scales on a domain [−170 dB/Hz, −50 dB/Hz].

Usually, a pulse-width modulated signal has a larger bandwidth than the carrier frequency signal. In consequence, the spectral parts of a baseband signal overlap, if up-converted by a carrier frequency $f_c$.

In some embodiments, a modulation frequency $f_{PWM}$ of some pulse-width modulated signals in a systems using the described technique is adjusted according to the following relation:

$$f_{PWM}*(n-0.5)=2*f_c, \quad (2)$$

n being an integer number. This results in a maximal SNR, in relation of the complex baseband signal $a(t)*e^{j*\phi(t)}$ to noise caused by image frequency.

Figure 8:
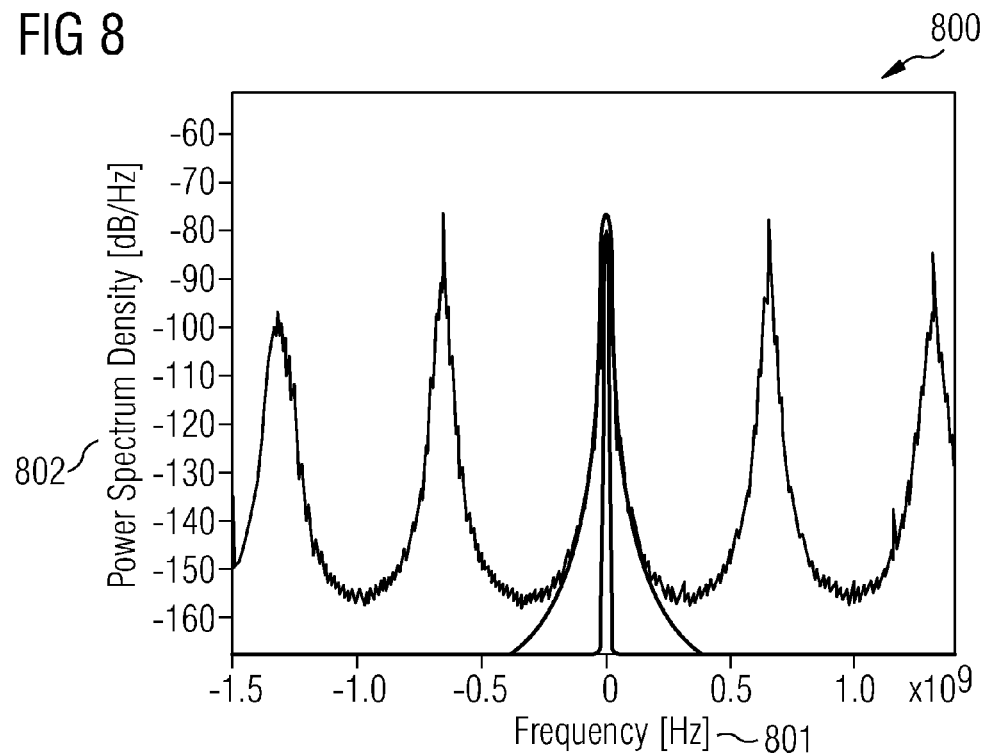
FIG. 8 is a signal diagram illustrating exemplary Signal-to-Noise-Ratio (SNR) of an Envelope Modulator.
Figure 9:
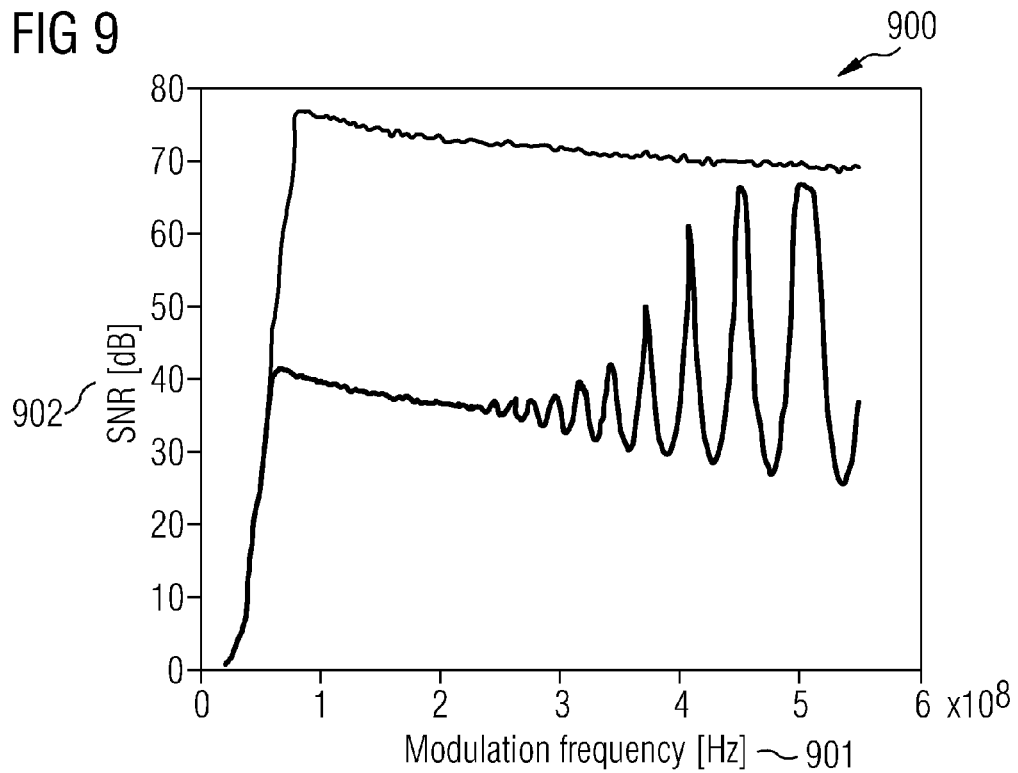
FIG. 9 is a signal diagram illustrating exemplary frequency spectrum of signals in relation to a up-conversion mixer.
Figure 10:
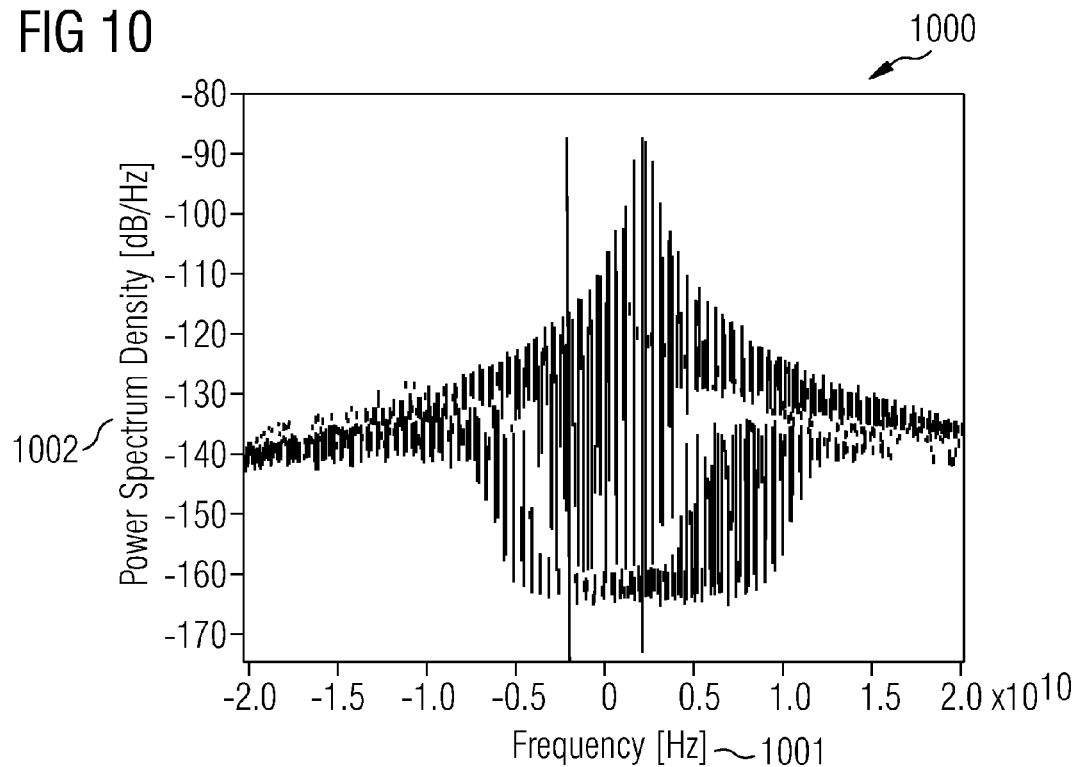
FIG. 10 is a signal diagram illustrating exemplary frequency spectrum of signals in relation to a up-conversion mixer.

FIG. 8 is a signal diagram 800 illustrating exemplary Signal-to-Noise-Ratio (SNR) of an Envelope Modulator. Abcissa 801 shows a frequency domain $[-1.5*10^9$ Hz, $1.5*10^9$ Hz] of a modulation frequency $f_{PWM}$. Ordinate 802 shows a domain of the SNR [0 dB, 80 dB]. The diagram shows a strong dependency of the SNR with respect to the modulation frequency $f_{PWM}$. A reason might be that spectral components concentrating around multiples of the modulation frequency $f_{PWM}$ get wider with higher frequency, so that they eventually overlap and band gaps get rare with high frequency. This effect is shown in FIGS. 9 and 10 exemplary frequency spectrums of signals in relation to a up-conversion mixer. FIG. 9 shows a Power Spectrum Density of modulation frequency $f_{PWM}$ at 500 MHz up-converted at different carrier frequency $f_c$. This corresponds to a SNR of approx. 70 dB. FIG. 10 shows a Power Spectrum Density of modulation frequency $f_{PWM}$ at 290 MHz up-converted at different carrier frequency $f_c$. Since a lower modulation frequency $f_{PWM}$ is chosen, spectral band gaps grow as compared to FIG. 9. The SNR is at approx. 43 dB, i.e. reduced as to a modulation frequency $f_{PWM}$ at 500 MHz.

The described technique makes use of further reducing the SNR requirements. Mirror contributions of the PWM modulated signal at $\pm 2*f_c$ are extracted, e.g. by high pass or bandpass filtering. The mirror contributions a mixed (e.g. by multiplication) with a phase modulated carrier signal to the desired carrier frequency $f_c$. The spectrum of such a signal is shown in FIGS. 11 and 12.

Figure 11:
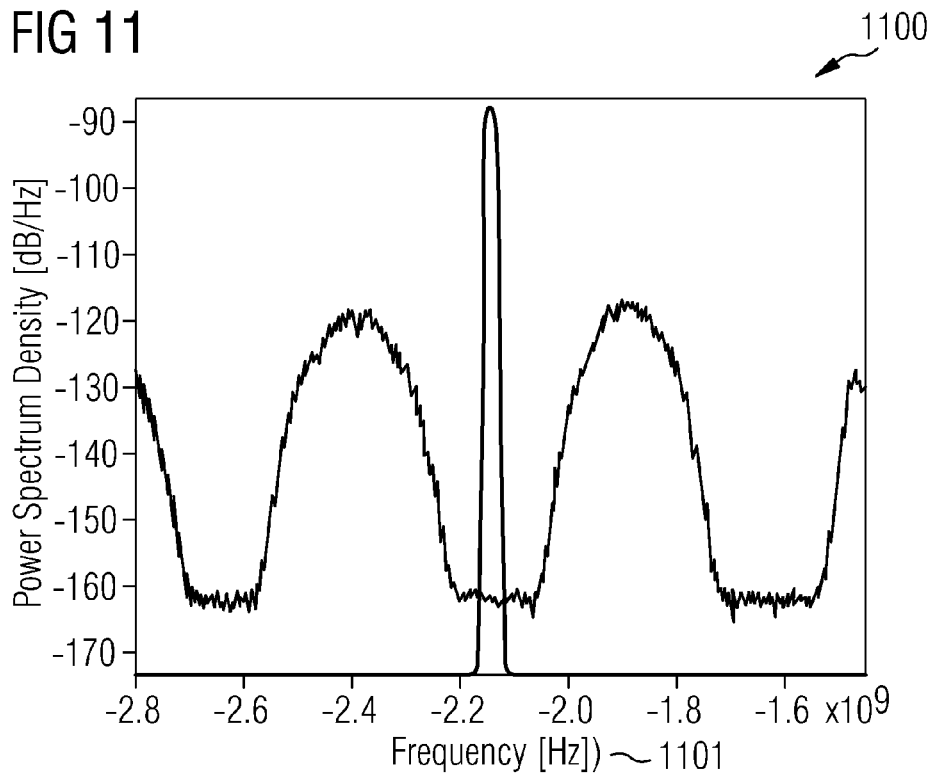
FIG. 11 is a signal diagram illustrating exemplary frequency spectrum of signals in relation to an up-conversion mixer.
Figure 12:
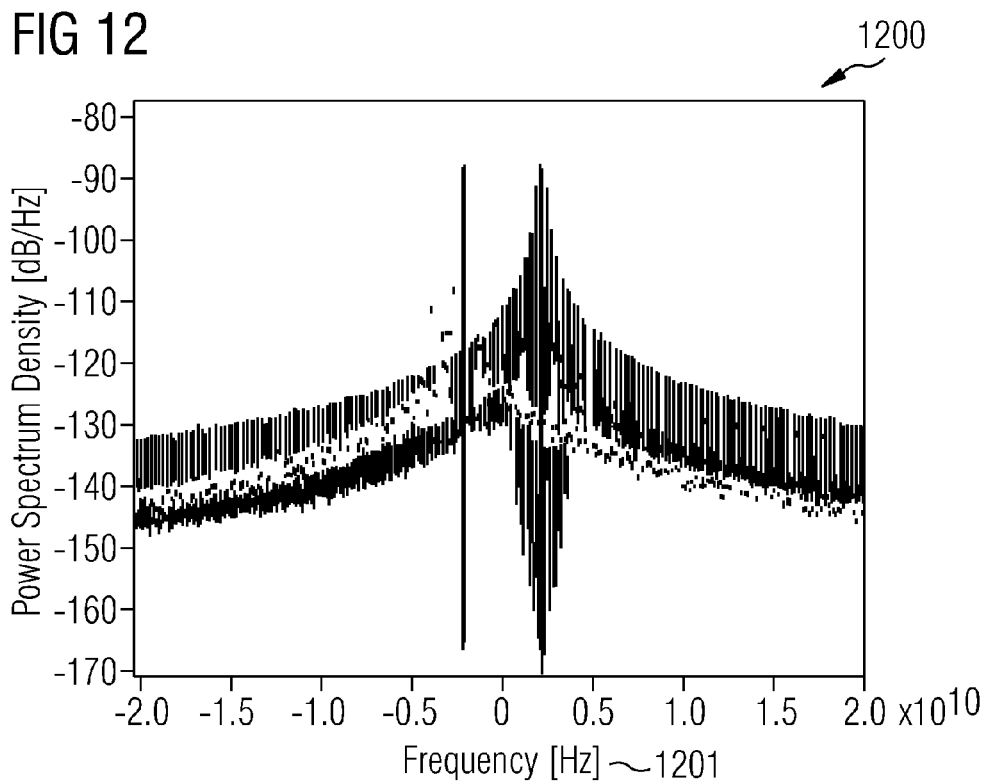
FIG. 12 is a signal diagram illustrating exemplary frequency spectrum of signals in relation to an up-conversion mixer.

As shown in FIGS. 11 and 12 power density of mirror contributions at $\pm 2*f_c$ is much smaller than components at the signal band around the carrier frequency $f_c$. The mirror contributions are amplified using a linear amplification, since smaller efficiency of a linear amplification in comparison to a switched amplification does not give rise to any major disadvantage. In contrast, a simple architecture of an amplifier may be used.

Figure 13:
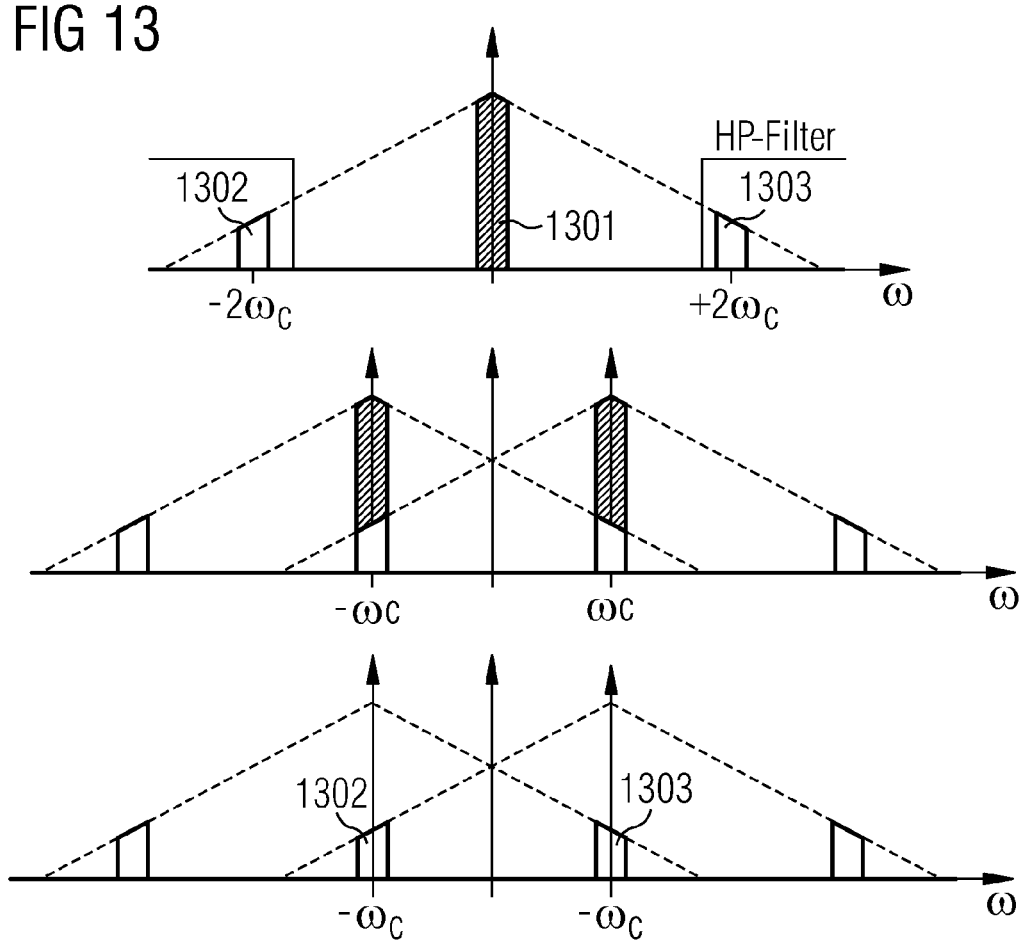
FIG. 13 is a schematic diagram of a technique to reduce mirror frequencies by a baseband-based modulation.

FIG. 13 shows a schematic diagram of a technique to reduce mirror frequencies by a baseband-based modulation. In a first graph, a spectrum of a PWM modulated signal is depicted, having desired baseband information 1301 and unwanted mirror contributions 1302 and 1303. In a second graph, the spectrum is shown after up-conversion to a carrier frequency $f_c$. It is shown that mirror contributions move into the signal band. A third graph shows how mirror contributions 1302 and 1303 are transferred to the carrier frequency $f_c$ in an error estimation unit. These shifted mirror contributions 1302 and 1303 are used to cancel unwanted signals of the second graph.

It has to be noted that mirror components are deterministic. Mirror contributions depend on the envelope, the modulation frequency $f_{PWM}$ used for PWM modulation, the modulation method, etc. The contributions may therefore e calculated be means of a digital signal processor instead of using a filter as shown with respect to the above-described examples.

Exemplary Method

FIG. 14 illustrates an exemplary method 1400 for modulating a useful signal into a modulated signal. The order, in which the method is described, is not intended to be construed as a limitation, and any number of the described method blocks can be combined in any order to implement the method, or alternate method. Additionally, individual blocks may be deleted from the method without departing from the spirit and scope of the subject matter described herein.

The method introduced may, but need not, be implemented at least partially in architecture(s) such as shown in FIGS. 1-4. In addition, it is to be appreciated, that certain acts in the methods need not be performed in the order described, may be modified, and/or may be omitted entirely. Furthermore, the method can be implemented in any suitable hardware, software, firmware, or a combination thereof, without departing from the scope of the invention.

At block 1402, a useful signal is received as input. The useful signal may comprise information to be transmitted, such as audio, video, mail, etc. At block 1404, the useful signal is coded to provide a first intermediate signal. Coding may be based on a methods such as Sigma-Delta Modulation or Pulse Width Modulation. At block 1406, the first intermediate signal is up-converted to provide a second intermediate signal. Up-converting refers to any shifting of center frequency of a spectrum. It is performed using a RF carrier signal, such as a carrier signal of a wireline or wireless communication system. The RF carrier signal may comprise a single carrier frequency or a frequency band. At block 1408, the second intermediate signal is amplified. Amplification may involve a switched amplification, thereby achieving a high efficiency. An output signal is provided.

At block 1410, a first intermediate error signal is provided. The first intermediate error signal may be derived from the first intermediate signal, e.g. involving a step of filtering. Since error contributions are deterministic, the first intermediate error signal may be provided by other means, such as a digital signal processing. At block 1412, the first intermediate error signal is up-converted to provide a second intermediate error signal. As above, up-converting refers to any shifting of center frequency of a spectrum. It is performed by using the RF carrier signal. At block 1414, the second intermediate error signal is amplified. Amplification may involve a linear amplification, thereby making use of a simple implementation. An error signal is provided.

At block 1416, a output signal and the error signal are combined to provide a modulated signal. This step may include a bandpass filtering of the modulated signal.

CONCLUSION

Although embodiments for power amplifier with output power control have been described in language specific to structural features and/or methods, it is to be understood that the appended claims are not necessarily limited to the specific features or methods described. Rather, the specific features and methods are disclosed as exemplary implementations for power amplifier with output power control.

What is claimed is:

1. A method for modulating a useful signal into a modulated signal comprising:
    coding the first signal to provide a pulse stream signal;
    phase modulating a second signal to provide an Local Oscillator (LO) signal;
    combining the pulse stream signal and the LO signal to provide an intermediate signal;
    amplifying the intermediate signal to provide an output signal;
    combining an intermediate error signal with the LO signal to provide a second intermediate error signal;
    amplifying the second intermediate error signal to provide an error signal; and
    combining the error signal with the output signal to provide a modulated signal.

2. The method according to claim 1, coding the useful signal involves one of a Sigma-Delta Modulation or a Pulse Width Modulation.

3. The method according to claim 1, wherein amplifying the intermediate signal involves use of switched amplification.

4. The method according to claim 1, wherein amplifying the second intermediate error signal involves use of linear amplification.

5. The method according to claim 1, wherein the first intermediate error signal is provided by filtering the pulse stream signal.

6. The method according to claim 1, wherein the amplifying of the second intermediate error signal to provide an error signal involves a linear amplification of the second intermediate error signal.

7. The method according to claim 1, further comprising Band Pass Filtering of the modulated signal.

8. A transmission device comprising:
    a first path that receives a first signal and that provides a pulse stream signal, the first path having a switched-mode output stage;

a second path that receives a second signal and that provides a phase modulated signal;

a combiner that receives the pulse stream signal and the phase modulated signal and provides an intermediate signal to the switched-mode output stage;

an error computation unit that provides an error signal representative of an Inband Signal Error of the pulse stream signal, the error computation unit having a linear output stage, the error computation unit including a filter coupled to a second combiner, the filter to provide the Inband Signal Error to the second combiner, and the second combiner to perform an operation on the Inband Signal Error and the phase modulated signal to provide the error signal; and an error correction unit that receives the intermediate signal and the error signal and that provides a transmission signal.

9. The transmission device according to claim 8, the modulation path being disposed to perform one of a Polar Modulation or a Cartesian Modulation.

10. The transmission device according to claim 8, the first path to perform an amplitude modulation.

11. The transmission device according to claim 10, the linear output stage being arranged downstream of the error computation unit.

12. The transmission device according to claim 8, the error correction unit comprising a combiner to combine an output signal from the switched-mode output stage and the error signal.

13. The transmission device according to claim 8, the error correction unit comprising a filter to provide a filtered transmission signal.

14. The transmission device according to claim 13, the filter being disposed as Band Pass Filter.

15. An apparatus, comprising:

a first Pulse Width Modulator (PWM) to receive a first input signal and provide a first pulse stream signal;

a second PWM to receive a second input signal and provide a second pulse stream signal;

an adder to combine first and second intermediate error signals to provide a combined error signal;

at least one amplifier to amplify, respectively, combined first and second pulse stream signals to provide first and second output signals; and a combiner to receive the combined error signal and the first and second output signals and to provide a transmission signal.

16. The apparatus according to claim 15, wherein the first input signal is an Inphase component signal and the second input signal is a Quadrature component signal.

17. The apparatus according to claim 15, wherein the first output signal is an Inphase output signal and the second output signal is a Quadrature output signal.

18. A modulator for modulating a useful signal into a modulated signal comprising:

a Pulse Width Modulator (PWM) that receives a signal and that provides a pulse stream signal derived from the signal;

a Phase Modulator that receives a second signal and that provides an Local Oscillator (LO) signal;

a first combiner that receives the pulse stream signal and the LO signal and that provides an intermediate signal;

a first output stage that receives the intermediate signal and that provides an output signal;

an error estimation block that receives the pulse stream signal provides a first intermediate error signal;

a second combiner that receives the first intermediate error signal and the LO signal and provides a second intermediate error signal;

a second output stage that receives the second intermediate error signal and that provides an error signal;

a combiner that receives the output signal and the error signal and that provides the modulated signal.

19. The modulator according to claim 18, wherein the error estimation comprises a filter to derive an error component of the pulse stream signal.

20. The modulator according to claim 18, wherein the first output stage comprises at least one switched amplifier.

21. The modulator according to claim 18, wherein the second output stage comprises at least one linear amplifier.

22. The modulator according to claim 18, further comprising a Band Pass Filter to filter the modulated signal.

23. The method according to claim 1, further comprising deriving the first intermediate error signal from the intermediate signal.

24. The apparatus according to claim 15, further comprising an error estimation block that receives the first pulse stream signal provides the first intermediate error signal; and a second combiner that receives the first intermediate error signal and an LO signal and provides the second intermediate error signal.

* * * * *